(12) United States Patent
Tabor

(10) Patent No.: US 8,335,419 B2
(45) Date of Patent: Dec. 18, 2012

(54) OPTICAL COMPONENTS WITH VARIABLE ELECTRO-CHROMIC EXTRA-MURAL ABSORPTION CAPABILITY

(75) Inventor: Kevin Tabor, Webster, MA (US)

(73) Assignee: Schott Corporation, Elmsford, NY (US)

( * ) Notice: Subject to any disclaimer, the term of this patent is extended or adjusted under 35 U.S.C. 154(b) by 277 days.

(21) Appl. No.: 12/589,634

(22) Filed: Oct. 26, 2009

(65) Prior Publication Data

US 2010/0119200 A1    May 13, 2010

Related U.S. Application Data

(60) Provisional application No. 61/198,795, filed on Nov. 10, 2008.

(51) Int. Cl.
*G02B 6/04* (2006.01)
(52) U.S. Cl. ........................................ 385/120
(58) Field of Classification Search ................ None
See application file for complete search history.

(56) References Cited

U.S. PATENT DOCUMENTS

| | | | |
|---|---|---|---|
| 3,369,125 A * | 2/1968 | Dueker ................. 250/214 LA |
| 4,245,883 A | 1/1981 | Johnson et al. | |
| 4,800,263 A * | 1/1989 | Dillon et al. ............ 250/214 LA |
| 4,851,659 A * | 7/1989 | Dillon et al. ............ 250/214 VT |
| 5,106,181 A | 4/1992 | Rockwell, III | |
| 5,959,711 A * | 9/1999 | Silverstein et al. ........... 349/159 |
| 7,221,835 B1 | 5/2007 | Weisser et al. | |
| 2009/0322987 A1* | 12/2009 | Dunn et al. ..................... 349/65 |
| 2010/0104248 A1* | 4/2010 | Sugawara et al. ............. 385/120 |

FOREIGN PATENT DOCUMENTS

| | | |
|---|---|---|
| DE | 1958810 A | 11/1969 |
| DE | 10034484 A1 | 1/2002 |
| GB | 2465082 A * | 5/2010 |
| JP | 07104324 A | 4/1995 |

* cited by examiner

*Primary Examiner* — Sung Pak
(74) *Attorney, Agent, or Firm* — Louis J. Franco; Law Office of Louis J. Franco

(57) ABSTRACT

An optical component includes at least one light-guiding element with a side surface extending between incident and emission faces between which light that is introduced into the incident face can propagate by internal reflection. Disposed over at least a portion of the side surface of at least one of the at least one light-guiding elements is an extramural absorption material that is configured to selectively absorb "stray light" that enters the incident face of the light-guiding element, but which exists through the side surface instead of the emission face. The absorption material is fabricated, at least in part, from an electro-chromic material exhibiting a translucency that is selectively adjustable in response to changes in at least one of (i) electrical current applied through at least a portion of the absorption material and (ii) an electrical potential difference applied between disparate locations within the absorption material.

16 Claims, 4 Drawing Sheets

FIG. 1A
(Background Art)
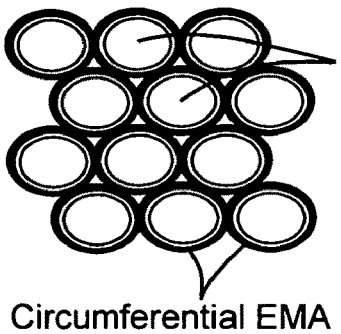
FIG. 1B
(Background Art)
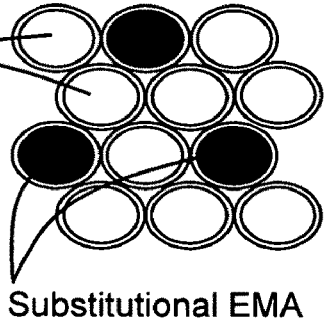
FIG. 1C
(Background Art)
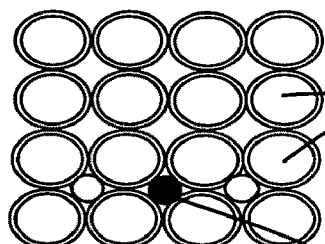
FIG. 1D
(Background Art)
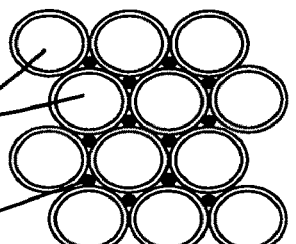
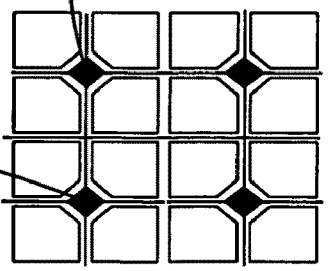
FIG. 1E
(Background Art)

View into Plane
IIA of FIG. 2

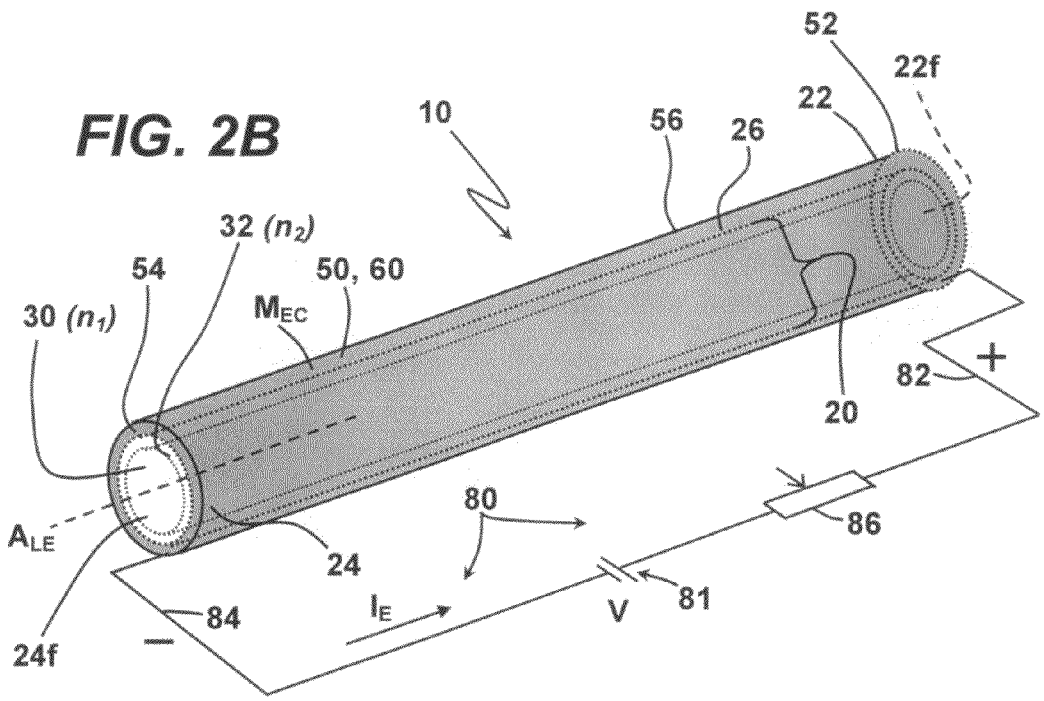

OPTICAL COMPONENTS WITH VARIABLE ELECTRO-CHROMIC EXTRA-MURAL ABSORPTION CAPABILITY

PROVISIONAL PRIORITY CLAIM

Priority based on Provisional Application, Ser. No. 61/198,795 filed Nov. 10, 2008, and entitled "OPTICAL COMPONENTS HAVING ELECTRO-CHROMIC CONTRAST ENHANCEMENT" is claimed. The entirety of the disclosure of the previous provisional application, including the drawings, is incorporated herein by reference as if set forth fully in the present application.

BACKGROUND

1. Field

Embodiments and implementations of the present invention relate generally to image-transferring arrays such as fiber optic faceplates and other optical fiber imaging and light-transmitting devices, and more particularly to the inclusion of integral contrast enhancement in such devices.

2. Brief Description of an Illustrative Environment and Related Art

The transmission of light and images through bundles comprised of flexible or adjacently fused light-conductive elements (e.g., optical fibers) is an established art. Image conduits such as inverters, tapers and "straight-throughs" are well known to practitioners of the optical fiber arts. Fused optical fiber image conduits find broad application as components in such devices as night visions goggles, rifle scopes, x-ray detectors and medical imaging apparatus, by way of non-limiting example.

The inclusion of light-absorbing materials (e.g., glasses) into fused optical components such as fiber optic faceplates, straight-throughs and tapers in order to suppress cross-talk, enhance contrast and control numerical aperture is widely known in the optical fiber industry. These absorbing materials, alternatively referred to as Extra-Murual Absorption (EMA) materials, media, glasses, fibers, filaments and rods, as indicated by context, are typically incorporated in accordance with one or more of three general methods. According to a first approach, an absorptive coating—or even a sleeve or tube—is applied to the outside of each constituent waveguide individually, yielding what is referred to as a "circumferential EMA." A cross-sectional view of an illustrative fiber bundle including fibers with circumferential EMA material is shown in FIG. 1A. With reference to FIG. 1B, a second approach indicates the substitution of selected light-conductive elements (e.g., fibers) within a bundle with absorbing fibers, wherein the substitute fibers are referred to alternatively as "substitutional," "replacement" or "statistical" EMA fibers. According to a third common approach, absorbing fibers are inserted into the interstitial packing vacancies in the fiber array. Examples of bundles including such fibers—known as "interstitial EMA fibers"—are shown FIGS. 1C, 1D and 1E.

Although circumferential, interstitial and substitutional EMA media have met with varying degrees of success in suppressing cross talk due to the refraction and propagation of unwanted stray light, the need for black glass tubing and/or individual EMA fibers, in various configurations, invariably adds to the complexity and expense of fabrication and, furthermore, can introduce aberrations into transferred images. Moreover, the introduction of different glass compositions in an array increases the potential for adverse interactions between incompatible glasses. A still further limitation of incorporating glass-based EMA elements into imaging or illumination bundles is that they must be incorporated into the structure early in the process and their light-absorbing capacity cannot be adjusted once they are incorporated.

Accordingly, there exists a need for light-transmissive optical components incorporating extramural-absorbing materials that (i) are not glass-based and (ii) have adjustable light-absorption characteristics.

SUMMARY

In accordance with a first illustrative embodiment, a light-transmissive optical component includes a light-guiding element having opposed incident and emission faces, and a light-guiding-element side surface extending between the incident and emission faces. Extending over at least a portion of the light-guiding element side surface is an extra-mural absorption layer. The extra-mural absorption layer comprises and an electro-chromic material the opacity of which—relative to a predetermined set of electro-magnetic wavelengths—is variable in response to a change in magnitude of at least one of (i) an electrical current applied through at least a portion of the layer and (ii) an electrical potential difference applied between disparate locations along the layer.

In each of various versions, the light-guiding element comprises a core fabricated from a first material having a first refractive index and a cladding fabricated from a second material fusedly disposed about the core and having a second refractive index, lower in magnitude than the first refractive index, such that light entering the incident face can propagate by internal reflection between the incident and emission faces. Moreover, one set of alternative versions incorporates a an electro-chromic extra-mural absorption layer formed from a non-glass polymeric material, while, in a second set of alternative versions, the layer is formed from a glass-based material.

In accordance with a second illustrative embodiment, an optical-component assembly comprises a bundle (e.g., plate) structure including opposed first and second plate faces and a matrix material retaining in fixed relative positions a plurality of light-guiding elements, such as the light-guiding elements described in association with the first illustrative embodiment. More specifically, each light-guiding element has opposed incident and emission faces and a light-guiding-element side surface extending between the incident and emission faces. The plural incident and emission faces partially define, respectively, the first and second bundle (e.g., plate) faces. In the second embodiment, the matrix material is the extra-mural absorption layer for each light-guiding element with which it is in contact. Accordingly, as with the extra-mural absorption layers previously described, the matrix material comprises and electro-chromic material the opacity of which is selectively adjustable in response to changes in magnitude of at least one of (i) an electrical current applied through at least a portion of the matrix and (ii) an electrical potential difference applied between disparate locations within the matrix.

While in some versions of a plate structure, for example, the opacity of the entire electro-chromic matrix can be altered, other versions are such that the opacity of the electro-chromic matrix is adjustable at either or both of the first and second plate faces. In still additional versions, the opacity at the first and second plate faces can be adjusted independently of one another. In such versions, a central portion of the matrix has a fixed opacity.

To the extent that terms such as "rod" and "rod-like" are used to describe light-guiding elements, and other components, these terms are used broadly and include, for is example, components having various cross-sectional geometries and components with diameters greater than there lengths. Moreover, the use of the term "diameter" does not imply a circular cross-sectional geometry. More specifically, although "diameter" is frequently thought of narrowly as the longest chord that can be fitted within the curve defining a circle, the more technical mathematical definition of that term is applicable to this description and the appended claims. For instance, chords within squares, rectangles, hexagons, and even, irregular shapes are also diameters. Accordingly, nothing in the preceding explanation, the detailed description, the appended claims or the drawings should be construed to attribute to the term "diameter" a meaning more narrow than common usage and technical mathematical usage would attribute to them.

Representative implementations are more completely described and depicted in the following detailed description and the accompanying drawings.

BRIEF DESCRIPTION OF THE DRAWINGS

FIG. 1A is a cross-sectional view of an optical fiber bundle in which each constituent light-conductive element has disposed peripherally (e.g., circumferentially) thereabout an extramural absorbing material;

FIG. 1B depicts a cross-section of an optical fiber bundle incorporating "substitutional" extramural absorbing fibers;

FIGS. 1C through 1E illustrate alternatively configured optical fiber bundle cross-sections including extramural absorbing materials situated in the interstices among constituent light-conductive elements (e.g., optical fibers);

FIG. 2B is a view of the optical component of FIG. 2 wherein the extramural absorption layer is in a partially activated state;

FIG. 2C is a view of the optical component of FIGS. 2 and 2B wherein the extramural absorption layer is in a fully activated (i.e., least translucent) state;

DETAILED DESCRIPTION

The following description of illustrative embodiments of optical components and optical-component assemblies including extra-mural absorption materials with selectively adjustable opacity is illustrative in nature and is therefore not intended to limit the invention or its application of uses. The various implementations, aspects, versions and embodiments described in the summary and detailed description are in the nature of non-limiting examples falling within the scope of the appended claims and do not serve to define the maximum scope of the claims.

Figure 2:
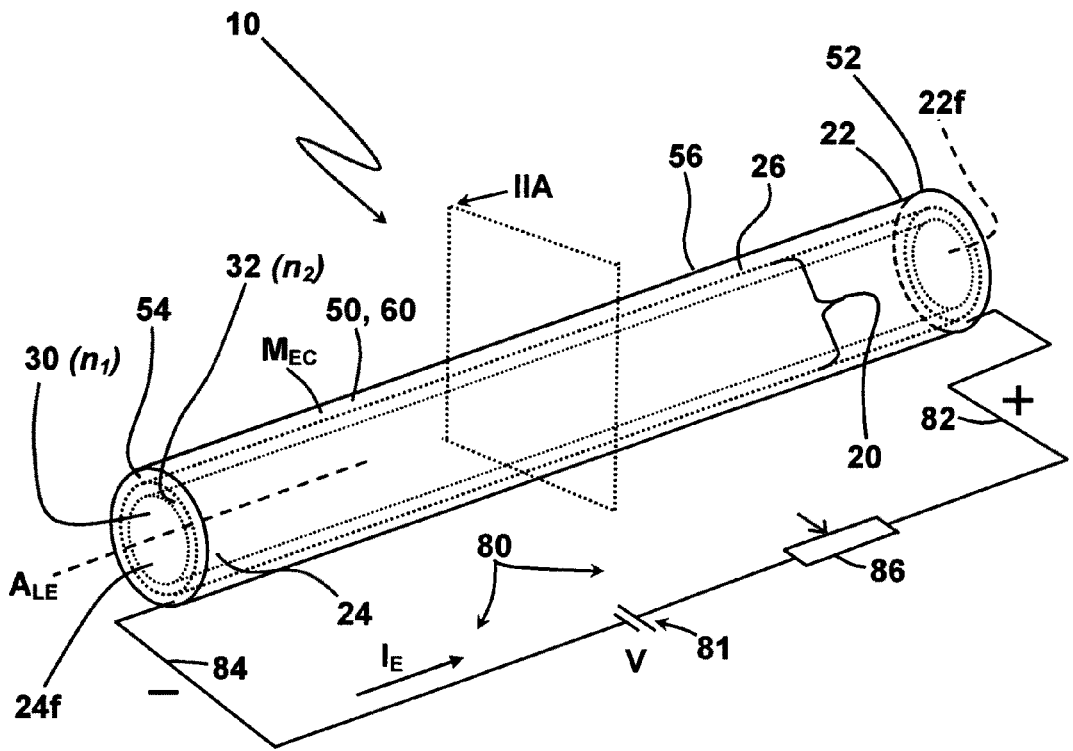
FIG. 2 shows a light-transmissive optical component including a light-guiding element over which is disposed an extramural absorption layer fabricated from an electro-chromic material the opacity of which is adjustable in response to the application of an electrical current through the layer, wherein the layer is in a non-activated state.

Referring to FIG. 2, a first illustrative optical component 10 includes an elongated light-guiding element 20 having an incident end 22 with an incident face 22$f$ and an emission end 24 with an emission face 24$f$ longitudinally opposite the incident face 22$f$. Additionally, a light-guiding-element side surface 26 extends between the incident and emission faces 22$f$ and 24$f$. In the illustrative version of FIG. 2, the light-guiding element 20 includes an optically-transmissive core 30 having a first refractive index $n_1$ and a cladding 32 fusedly disposed about the core 30 and having a second refractive index $n_2$, lower in magnitude than the first refractive index $n_1$, such that light entering either of the incident face 22$f$ can propagate by internal reflection through the core 30 and exit the emission face 24$f$. It will be appreciated that the designations of incident and emission ends and faces 22 and 22$f$ and 22 and 24$f$ have been made arbitrarily for illustrative purposes and that, in practice vis-à-vis an actual embodiment, the incident face 22$f$ is that face through which light is introduced into the light-guiding element 20, while the emission face 24$f$ is the opposite face through which that light exists the light-guiding element 20. Moreover, while the light-guiding element 20 depicted in FIG. 2 is defined by a cylindrical side surface 26, as explained in the summary, optical components 10 including light-guiding elements 20 of alternative configurations are within the scope and contemplation of the invention.

Figure 2A:
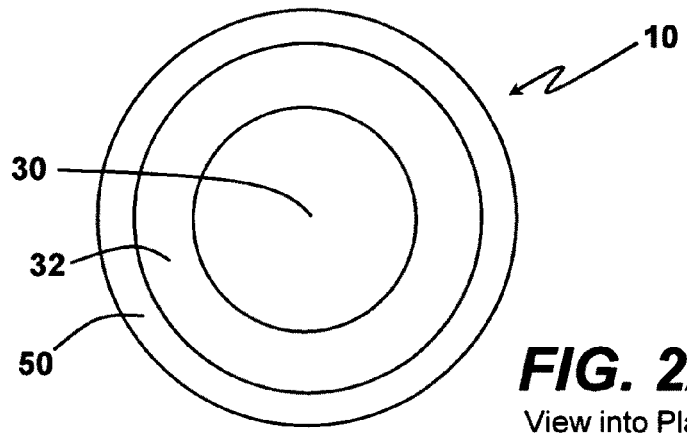
FIG. 2A is a cross-sectional view of the optical component of FIG. 2 as viewed into the plane IA.

With continued reference to FIG. 2, there is disposed about the light-guiding-element side surface 26 an optical layer 50. The optical layer 50 has first and second optical-layer ends 52 and 54 and an optical-layer exterior surface 56 extending between the optical-layer ends 52 and 54. Although in the illustrative version of FIG. 2, the optical layer 50 is disposed over the entire length of the light-guiding element 20, and about the entire periphery defined by the side surface 26 as viewed into a plane IA orthogonal to the longitudinal element axis $A_{LE}$ (FIG. 2A), it is to be understood that embodiments wherein the optical layer 50 is disposed over less than the entire length, or about less that the entire periphery, of the light-guiding-element side surface 26 are within the scope and contemplation of the invention.

The optical layer 50 is an extramural absorption layer 60 configured to selectively absorb "stray light" that enters the incident face 22$f$ of the light-guiding element 20, but exists through the side surface 26 instead of the emission face 24$f$. The absorption layer 60 is fabricated, at least in part, from an electro-chromic material $M_{EC}$. The electro-chromic material $M_{EC}$ exhibits an opacity that is selectively adjustable in response to changes in magnitude of at least one of (i) an electrical current $I_E$ through at least a portion of the optical layer 50 (ii) an electrical potential difference (voltage V) applied between disparate locations along the optical layer 50. While in a practical embodiment, the tunable opacity range will include various degrees of translucency exclusive of the opposed extremes represented by total transparency and total opacity (or "blackness), for illustrative purposes, FIGS. 2, 2B and 2C show the same optical component 10 in which the optical layer 50 is (i) totally transparent (FIG. 2), (ii) intermediately transparent or "gray" (FIG. 2B) and (iii) totally opaque (FIG. 2C). In any particular embodiment, the electro-chromic material $M_{EC}$ is selected such that either (i) translucency decreases (or opacity increases) with increases in the magnitude of applied electrical current $I_E$ or (ii) translucency increases with increases in magnitude of applied electrical current $I_E$. It will be appreciated the electrical current $I_E$ is applied by establishing a potential difference V (i.e., voltage) between disparate locations along the along the electro-chromic optical layer 50. In the illustrative version of FIGS. 2 through 2C, a simple electrical circuit 80 is schematically depicted. The circuit 80 includes an electrical power source 81, a first electrical lead 82 electrically coupled to the first optical-layer end 52, a second electrical lead 84 electrically coupled to the second optical-layer end 54, and a voltage-control device 86 (e.g. a potentiometer) for varying the magnitude of the potential difference V between the first and second electrical leads 82 and 84.

It is clear that the illustrative optical component 10 of FIGS. 2 through 2C represents a single internally-reflecting light-guiding element 20 with a circumferentially-disposed—or, more generally, a peripherally-disposed EMA material. However, within the scope and contemplation are assemblies including multiple, variously-arrayed light-guiding elements 20 to form, by way of non-limiting example, components such as elongated image bundles and image-transferring faceplates. Whether, in any particular assembly, electro-chromic material $M_{EC}$ is incorporated circumferentially about selected individual light-guiding elements, interstitially among plural light-guiding elements, or substitutionally, each such assembly includes at least one light-guiding element with a side surface over at least a portion of which there is disposed an extra-mural absorption layer of electro-chromic material $M_{EC}$.

Figure 3:
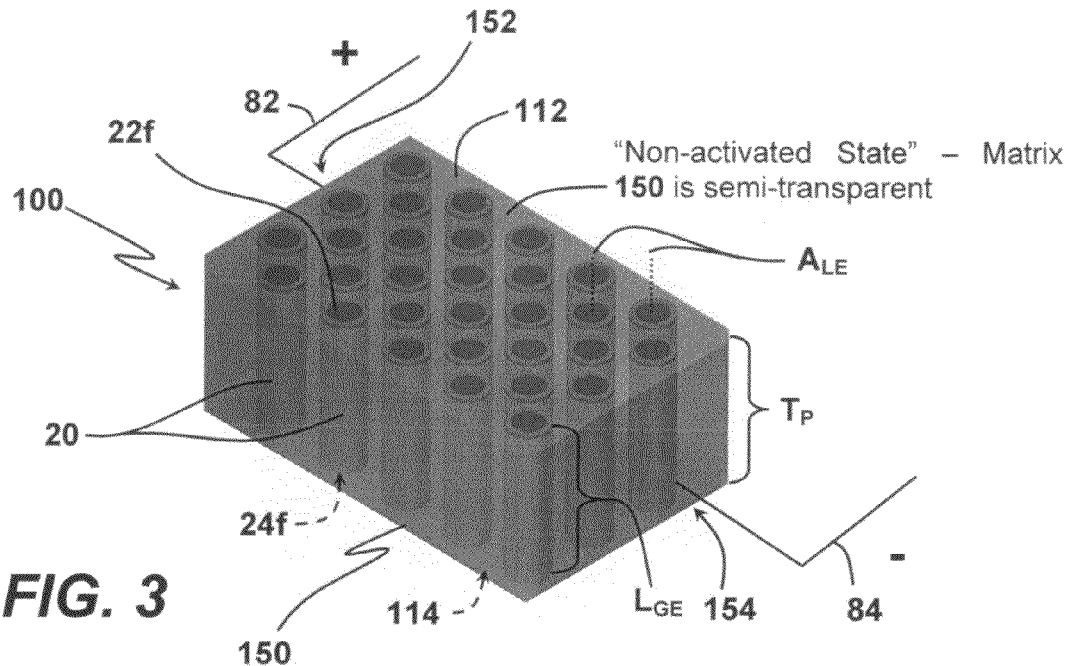
FIG. 3 shows an illustrative image-transferring faceplate including a plurality of rod-like light-guiding elements supported with a matrix of electro-chromic material the opacity of which is adjustable in response to the application of an electrical current through the layer, wherein the layer is in a non-activated state.

As aforementioned, among the components in which the inclusion of electro-chromic material $M_{EC}$ would be particularly advantageous are image-transferring bundles including, for example, optical fiber faceplates. Accordingly, shown in FIG. 3 is an illustrative image-transferring faceplate 100 including opposed first and second plate faces 112 and 114. A plurality of rod-like light-guiding elements 20 is retained within a matrix 150 of electro-chromic material $M_{EC}$. In the embodiment depicted, each light-guiding element 20 is of a construction similar to the optical element 20 shown in FIGS. 2 through 2C and, to the extent that the light-guiding elements 20 of the faceplate 100 include sub-elements and portions corresponding to those of the light-guiding elements 20 of FIGS. 2 through 2C, like reference characters are used to identify such sub-elements and portions.

With continued reference to FIG. 3, each light-guiding element 20 includes opposed incident and emission faces 22f and 24f coinciding with, and forming a part of, respectively, the first and second plate faces 112 and 114. Accordingly, in the particular version of FIG. 3 in which the longitudinal element axis $A_{LE}$ of each constituent light-guiding element 20 is oriented orthogonally to the parallel first and second plate faces 112 and 114, the length $L_{GE}$ of each light-guiding element 20 corresponds to the plate thickness $T_P$. Notwithstanding this latter observation vis-à-vis the particular embodiment of FIG. 3, plates having profiles that are of other-than-uniform thickness and/or in which the constituent light-guiding elements 20 are other than mutually parallel (e.g. convergent) are within the scope and contemplation of the invention.

In a manner analogous to which the relative translucency of the electro-chromic optical layer 50 of FIGS. 2 through 2C can be "tuned" by the selective application of a voltage between disparate locations along the electro-chromic optical layer 50, the opacity of the matrix 150 in optical-component assemblies such as the faceplate 100 of FIG. 3 can be selectively adjusted. In FIG. 3, first and second electrical leads 82 and 84 are electrically coupled to disparate first and second locations 152 and 154 along the matrix 150 in order to selectively apply a potential difference V across the matrix 150. In FIG. 3, the matrix 150 is in a "non-activated state" as, for example, when no electrical current $I_E$ is applied through the matrix 150. In the non-activated state, the matrix 150 is at least partially translucent.

Figure 3A:
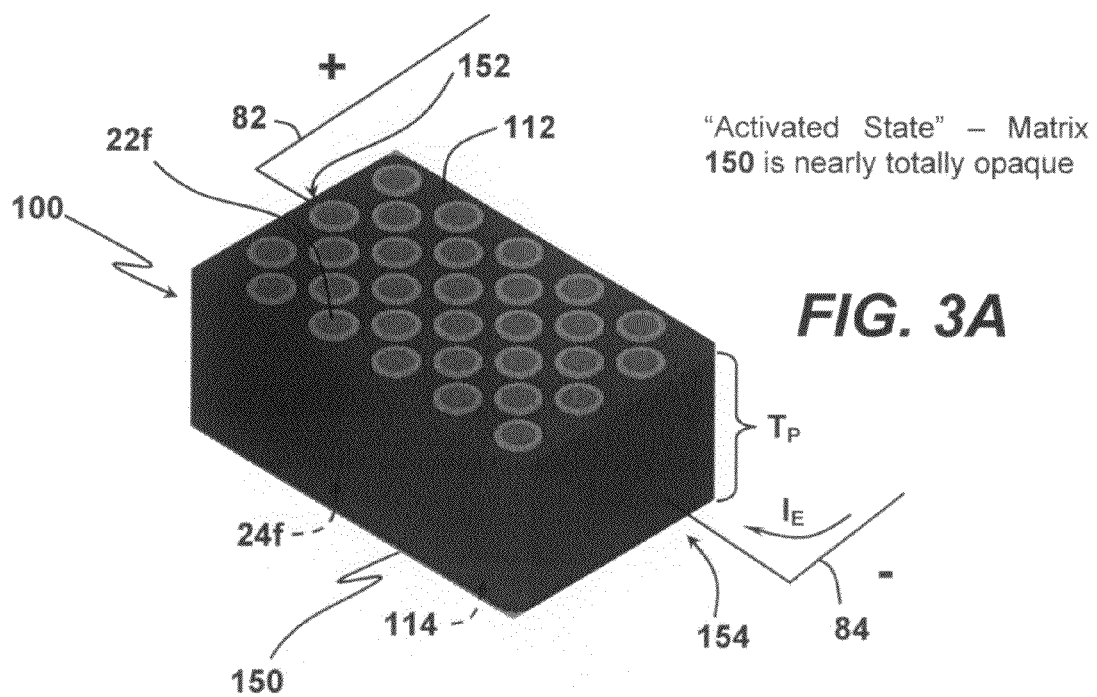
FIG. 3A is a view of the faceplate of FIG. 3 wherein the matrix is in an activated state in which it is less translucent (or more opaque) than it is in the view of FIG. 3.

FIG. 3A shows the same faceplate 100 that is shown in FIG. 3. However, in FIG. 3A, the matrix 150 is more opaque than it is in FIG. 3, corresponding to an activated state in which an electrical current $I_E$ is applied through the matrix 150. In FIGS. 3 and 3A, only the electrical leads 82 and 84 of a non-depicted electrical circuit are shown, the depiction of an additional circuit being deemed unnecessary in light of the illustrative circuit 80 shown and described in association with the embodiment of FIGS. 2 through 2C.

Although the embodiments of FIGS. 2 through 2C and 3 and 3A are described as incorporating electro-chromic material $M_{EC}$ that becomes more opaque with the application of increased electrical current, it is to be understood that within the scope and contemplation of the invention as expressed in this description and the appended claims are versions in with the opacity of the electro-chromic material $M_{EC}$ decreases with applied electrical current. Accordingly, in the absence of an express claim limitation to the contrary, the invention as defined in the appended claims is not limited to constructions incorporating electro-chromic material $M_{EC}$ the opacity of which increases with applied electrical current. Moreover, alternative versions in which the electro-chromic material $M_{EC}$ is at least one of (i) a glass-based material and (ii) a non-glass polymeric material are within the scope and contemplation of the invention.

The foregoing is considered to be illustrative of the principles of the invention. Furthermore, since modifications and changes to various aspects and implementations will occur to those skilled in the art without departing from the scope and spirit of the invention, it is to be understood that the foregoing does not limit the invention as expressed in the appended claims to the exact constructions, implementations and versions shown and described.

What is claimed is:

1. A light-transmissive optical component comprising:
    a light-guiding element having opposed incident and emission faces, and a light-guiding-element side surface extending between the incident and emission faces; and
    an extra-mural absorption layer extending over at least a portion of the light-guiding-element side surface and comprising an electro-chromic material the opacity of which is variable in response to a change in magnitude of at least one of (i) an electrical current applied through at least a portion of the layer and (ii) an electrical potential difference applied between disparate locations along the layer.

2. The optical component of claim 1 wherein the light-guiding element comprises a core fabricated from a first material having a first refractive index and a cladding fabricated from a second material fusedly disposed about the core and having a second refractive index, lower in magnitude than the first refractive index, such that light entering the incident face can propagate by internal reflection between the incident and emission faces.

3. The optical component of claim 2 wherein the extramural absorption layer is formed from a non-glass polymeric material.

4. The optical component of claim 2 wherein the extramural absorption layer is formed from a glass-based material.

5. The optical component of claim 1 wherein the extramural absorption layer is formed from a non-glass polymeric material.

6. The optical component of claim 1 wherein the extramural absorption layer is formed from a glass-based material.

7. A light-transmissive optical component comprising:

an elongated light-guiding element having longitudinally opposed incident and emission faces, and a light-guiding-element side surface extending between the incident and emission faces; and an optical layer extending over at least a portion of the length of the light-guiding element and being disposed about at least a portion of the periphery of the light-guiding-element side surface as viewed into a plane orthogonal to a longitudinal axis of the light-guiding element, the optical layer having first and second optical-layer ends and an optical-layer exterior surface extending between the first and second optical-layer ends; wherein the optical layer is an extra-mural absorption layer comprising an electro-chromic material having an opacity that is selectively one of (i) activatible and (ii) de-activatible in response to an electrical potential difference applied between disparate locations along the optical layer.

8. The optical component of claim 7 wherein the light-guiding element comprises a core fabricated from a first material having a first refractive index and a cladding fabricated from a second material fusedly disposed about the core and having a second refractive index, lower in magnitude than the first refractive index, such that light entering the incident face can propagate by internal reflection between the incident and emission faces.

9. The optical component of claim 8 wherein the optical layer is formed from a non-glass polymeric material.

10. The optical component of claim 8 wherein the optical layer is formed from a glass-based material.

11. An optical-component assembly comprising:
a plate structure including opposed first and second plate faces and a matrix material retaining in fixed relative positions a plurality of light-guiding elements, each light-guiding element having opposed incident and emission faces and a light-guiding-element side surface extending between the incident and emission faces; wherein
(a) the incident and emission faces partially define, respectively, the first and second plate faces; and
(b) the matrix material is electro-chromic and exhibits an opacity that is selectively adjustable in response to changes in magnitude of at least one of (i) an electrical current applied through at least a portion of the matrix and (ii) an electrical potential difference applied between disparate locations within the matrix.

12. The optical-component assembly of claim 11 wherein each light-guiding element comprises a core fabricated from a first material having a first refractive index and a cladding fabricated from a second material fusedly disposed about the core and having a second refractive index, lower in magnitude than the first refractive index, such that light entering the incident face can propagate by internal reflection between the incident and emission faces.

13. The optical component assembly of claim 12 wherein the matrix is formed from a non-glass polymeric material.

14. The optical component assembly of claim 12 wherein the matrix is formed from a glass-based material.

15. The optical component assembly of claim 12 wherein the opacity of the electro-chromic material increases with increased magnitude of an applied electrical current.

16. The optical component assembly of claim 12 wherein the opacity of the electro-chromic material decreases with increased magnitude of an applied electrical current.

* * * * *